United States Patent [19]

Shavit

[11] 4,210,900
[45] Jul. 1, 1980

[54] SURFACE ACOUSTIC WAVE CODE READER

[75] Inventor: Gideon Shavit, Highland Park, Ill.

[73] Assignee: Honeywell Inc., Minneapolis, Minn.

[21] Appl. No.: 934,155

[22] Filed: Aug. 16, 1978

[51] Int. Cl.² .............................................. H04Q 3/00
[52] U.S. Cl. .......................... 340/149 R; 340/149 A; 340/543
[58] Field of Search ............... 340/149 A, 149 R, 541, 340/542, 543; 365/182

[56] References Cited

U.S. PATENT DOCUMENTS

| | | | |
|---|---|---|---|
| 3,299,424 | 1/1967 | Jinding | 343/6.5 |
| 3,624,608 | 11/1971 | Actman | 340/149 A |
| 3,627,992 | 12/1971 | Davies | 235/61.11 J |
| 3,668,662 | 6/1972 | Zimmerman | 340/173 RC |
| 3,780,269 | 12/1973 | Hunn | 235/61.11 H |
| 3,945,099 | 3/1976 | Kansy | 29/25.35 |

Primary Examiner—Harold I. Pitts
Attorney, Agent, or Firm—Trevor B. Joike

[57] ABSTRACT

A system is disclosed for reading a code established by a surface acoustic wave device. The system has a first antenna connected to a supply for transmitting a signal, a second antenna for receiving said signal and supplying it to a first transducer on a surface acoustic wave device, the first transducer converting the signal into surface acoustic waves, a second transducer on the surface acoustic wave device for converting the surface acoustic waves to a coded signal, a third antenna for transmitting the coded signal, and a fourth antenna for receiving the coded signal and connected to a receiver for providing an output dependent upon the coded signal. This system is particularly useful for access control systems.

17 Claims, 11 Drawing Figures

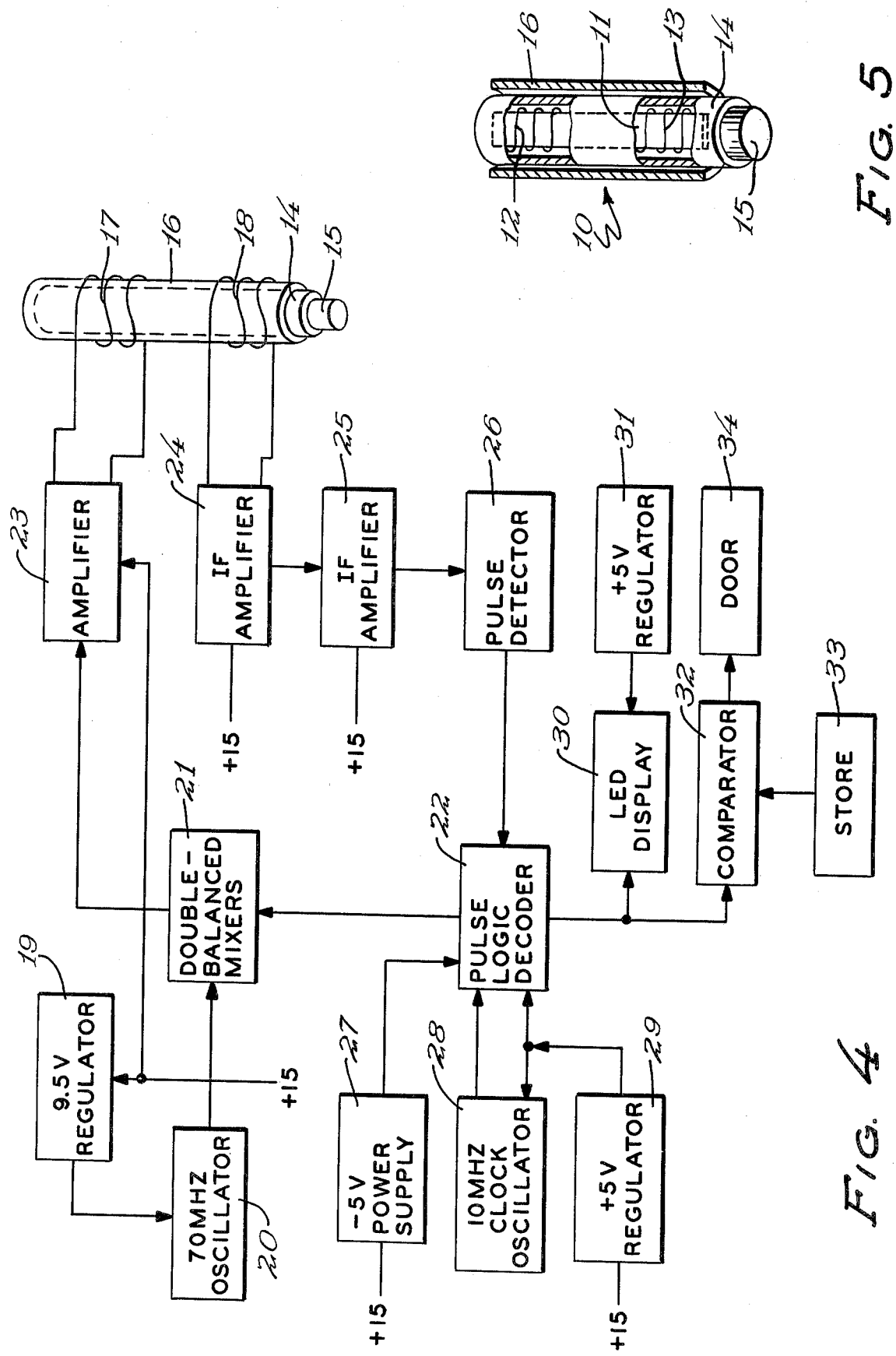

SURFACE ACOUSTIC WAVE CODE READER

BACKGROUND OF THE INVENTION

This invention relates to a reader for coded surface acoustic wave devices which reader is particularly useful for controlling access to a protected area.

Access control systems have been utilized in the past to restrict access to a protected area to only those who are authorized to enter. Such systems usually involve a card reader into which a coded card is inserted and read. The code on the card, which may periodically be changed, may be identical for all those wishing to enter the protected area or each person who is authorized to enter the area may be assigned his own personal code which again may be periodically changed. Upon the recognition of a permissible code, the card reader and associated system will permit access to the protected area.

These card readers usually comprise a cabinet for housing the access control system or subsystem thereof and typically have a plurality of sensing fingers for making contact with the cards inserted into the reader and for sensing the code on the card to allow access to the protected area if the card carrier has the proper code. To gain access to the protected area, the card is inserted into a slot in the cabinet which results in the wiping over of the surface of the card by the sensing fingers during both this insertion and the subsequent withdrawal of the card.

Because these typical prior art card readers involve contact between the reader and the card, there is substantial wear and tear on both the reader and the card which adversely affects the reliability of the overall system. Moreover, since there is direct contact between the reader and the card, and since card readers used in access control systems are quite often located outdoors, certain elements of the card reader, notably the sensing fingers, are exposed to the vageries of weather and are, therefore, subject to corrosion which again adversely affects the reliability of the system.

The present invention relies upon the use of a surface acoustic wave device in a code reading system to solve many of the problems of the prior art card readers. Because a coded surface acoustic wave device is used in conjunction with a reader, there is no necessity of contact between the reader and the device which eliminates the wear and tear of the prior art card readers and there is no necessity for any exposed elements which eliminates the weather-proofing problem of the prior art card readers. Moreover, a surface acoustic wave device reading system is less costly than many prior art card readers while still providing for a large number of codes which can be recognized by the system.

Although it is important to the reader of the present invention and to the access control system in which the present invention can be utilized that the surface acoustic wave device be coded, the specific method chosen to code the surface acoustic wave devices is not essential to the practice of the present invention. Indeed, several methods are known by which surface acoustic wave devices can be coded for such uses as fixed code filters, programmable matched filters, delay lines, multiplexers, storage, and commercial identification. Neither these devices, nor the types of the codes they employ, nor the manner in which they are encoded are important to the reader of the present invention nor to access control systems of the present invention.

SUMMARY OF THE INVENTION

The present invention includes a reading system for reading a coded surface acoustic wave device having a transmitter or supply for transmitting energy, a surface acoustic wave device for receiving said energy and converting it into surface acoustic waves and for converting the surface acoustic waves into a coded signal and a receiver for providing an output dependent upon the coded signal. The outputs can be used for controlling access to a protected area. Moreover, the reader and the surface acoustic wave device can be constructed to have corresponding transmitting and receiving antennas in sufficiently close proximity to improve the coupling between the reader and the surface acoustic wave device and may be arranged in a weather-proofed type arrangement.

BRIEF DESCRIPTION OF THE DRAWINGS

These and other features and advantages will become apparent from a detailed consideration of the invention when taken in conjunction with the drawings in which:

FIG. 4 shows a block diagram of the reading system for use with the surface acoustic wave device according to the present invention;

FIG. 5 shows a tubular arrangement for containing the surface acoustic wave device;

DETAILED DESCRIPTION OF THE INVENTION

A surface acoustic wave transponder is a device which, after receiving a predetermined signal, converts the signal into surface acoustic waves and reconverts the waves into a coded signal for transmission to a receiver. Each transponder can have a unique code associated with it. Thus, in an access control system, coded transponders can be used to discriminate between valid and invalid entry attempts.

Figure 1:
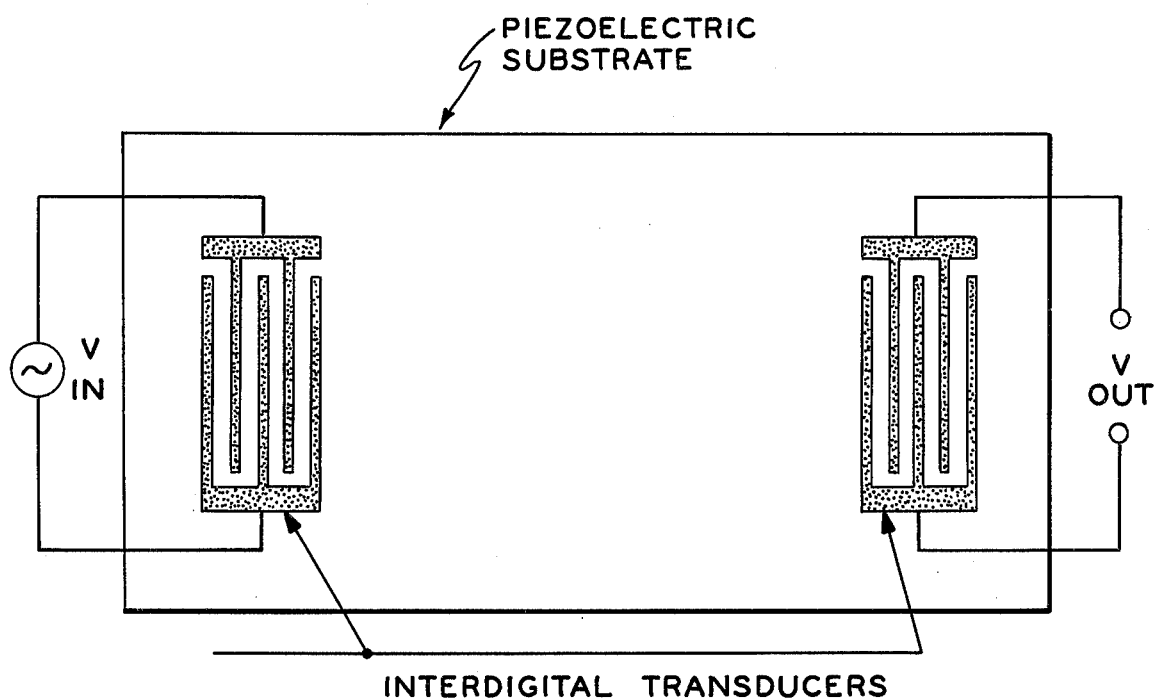
FIG. 1 shows a surface acoustic wave device.

Surface acoustic wave devices lend themselves to the construction of small and inexpensive delay lines because acoustical waves on solids propagate with a velocity of about $10^5$ times slower than the speed of light. An interdigital transducer (IDT), as shown in FIG. 1, is used in the present invention to convert an electrical signal into an acoustic wave on a piezoelectric substrate material. After the acoustic wave travels the prescribed distance on the substrate, a second IDT is used to reconvert it to an electrical signal. The distance between the two IDT's determines the delay between the time the signal is applied to the transmitting IDT and the time it is detected by the receiving IDT. The substrate material may be, for example, ST-cut crystalline quartz.

Figure 2:
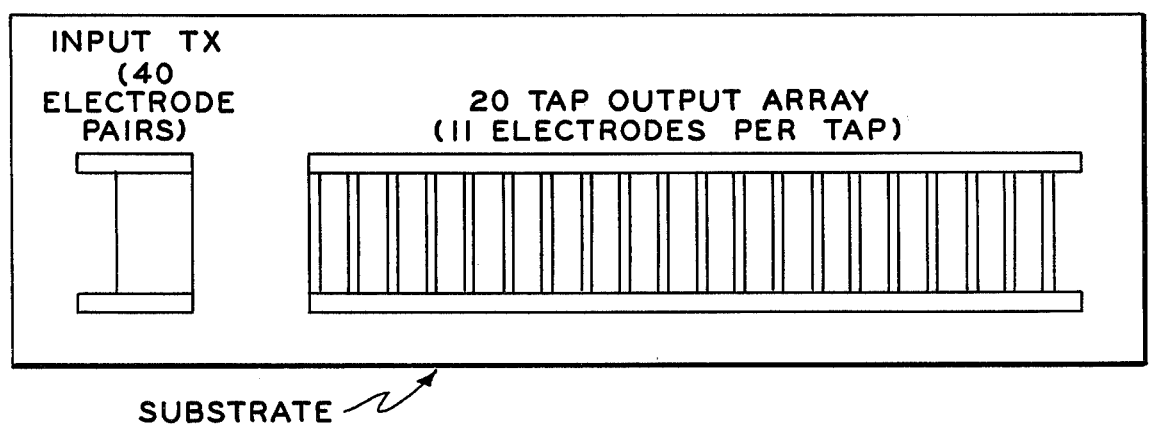
FIG. 2 shows the tap arrangement for a surface acoustic wave device according to the invention.

As shown in FIG. 2, the acoustic surface wave device on a piezoelectric substrate can be tapped with IDT's at various distances from the transmitting IDT. The input IDT consists of 40 electrode pairs for receiving a signal, such as an RF pulse, and converting this signal into a surface acoustic wave. The output array consists of 20 taps each of which is made up of eleven electrodes per tap. The delay between the time when the input IDT receives the signal and the time that the first tap receives the surface acoustic wave and converts that to an electrical signal output is dependent upon the distance between the input IDT and the first tap. The second tap will produce an electrical signal at a time delayed from the time when the first tap produces its signal dependent upon the distance between the first and second taps, and so on.

The presence or absence of a receiving IDT can represent, therefore, a digital "1" or "0." Specifically, if the second tap is severed, it will not produce an output signal. The receiver, knowing the distances between the taps of the receiving IDT and missing a signal in the designated time slot, will ascribe a zero thereto. The third tap, if it is not severed will produce an electrical signal in its time slot which will be received as a logical "1" by the receiver. The receiving IDT having 20 taps is capable of providing a 20 bit code allowing for over $10^6$ individually identifiable codes.

Figure 3:
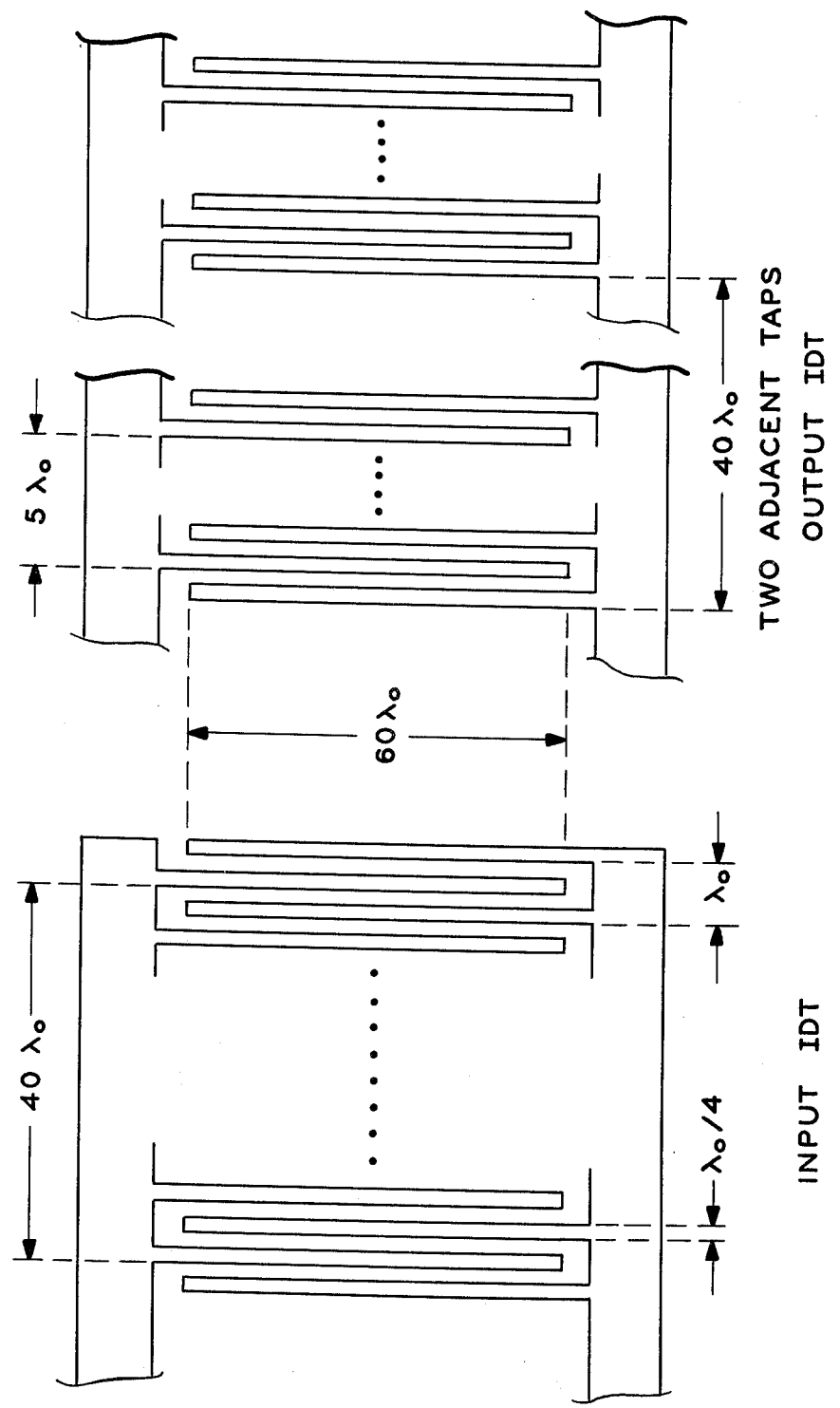
FIG. 3 shows the construction of the taps shown in the device of FIG. 2.

ST-cut crystalline quartz may be used for the substrate material. In such a material, the delay time is about three microseconds per centimeter. Thus, the spacing between the output IDT taps can, for example, be such as to result in a delay of one microsecond between taps. The surface wave velocity on ST-quartz, in the X direction, is approximately $3.15 \times 10^3$ meters per second. If a carrier frequency or center frequency for the RF signal which is applied to the transponder is 70 MHz, the wave length is $45 \times 10^{-6}$ m. FIG. 3 shows how a surface acoustic wave device can be made to fit these parameters. The input IDT consists of a 40 electrode pair arrangement wherein the spacing between the first and last electrode fingers of the top electrode is 40 wave lengths. Specifically, there are 40 such fingers each spaced one wave length apart from the center of one electrode finger to the center of the next electrode finger. The fingers themselves are a quarter wave length in width and are spaced from each other by a quarter wave length. Similarly, the output IDT comprising 20 taps, each tap having eleven electrodes. As shown, the distance between the first and last electrode fingers of the top electrode of the output IDT is five wave lengths. The spacing between the first electrode finger of the first tap and the first electrode finger of the next succeeding tap is 40 wave lengths. The overlap between the top and bottom electrodes is 60 wave lengths. With the above assumed parameters, the overlap is 2.7 millimeters and the crystal substrate should be at least 8 centimeters long to allow for the input and output IDT's and for appropriate spacing between them as well as adequate spacing for the edges of the substrate.

FIG. 4 shows a system for supplying the surface acoustic wave device with an electrical signal and for receiving and processing the code supplied by the device. The surface acoustic wave device itself, as shown in FIG. 5, may comprise a substrate 11 on which the electrodes are placed and around which are wound a receiving antenna 12 connected to the input IDT for receiving the electrical signal and converting it into surface acoustic waves and a transmitting antenna 13, connected to the 20 tap output IDT which converts the surface acoustic wave into the coded output, for transmission of the coded output to the receiver. The surface acoustic wave device may be contained, for example, in a plastic tube 14 having a cap or rubber stopper 15.

Although a card or other type of surface acoustic wave device can be used, the device shown in FIG. 5 has the advantage that it can be closely coupled with the transmitting and receiving antennas of the transceiver shown in FIG. 4.

When the surface acoustic wave device is to be read, for example to gain access to a protected area, the device 10 is inserted into a second tube 16 having a larger diameter than the tube 14 shown in FIG. 5. Wrapped around the tube 16 are a first antenna or coil 17 for transmitting electrical energy to be received by antenna 12 of the surface acoustic wave device 10 and a receiving antenna 18 for receiving the coded signal transmitted by the antenna 13 of the surface acoustical wave device. The surface acoustic wave device is a passive transponder and requires no separate power source for the generation of the coded signal. Furthermore, although the receiving and transmitting antennas 12 and 13, in the form of coils, may be a single antenna, the preferred embodiment shows these antennas as separate antennas to minimize interfering surface acoustic waves travelling in both directions along the substrate.

A voltage regulator 19 is connected to a voltage source for supplying regulated voltage to oscillator 20 which may produce a signal having, for example, a frequency of 70 MHz. Oscillator 20 supplies this 70 MHz carrier frequency to two double-balanced mixers 21 which modulate the 70 MHz signal with a signal supplied by the pulse logic decoder 22. The modulated signal is amplified by amplifier 23 and supplied to antenna 17 for transmission to surface acoustic wave device 10. The surface acoustic wave device converts this signal into a coded signal which is transmitted by antenna 13 to antenna 18. The signal received by antenna 18 is then amplified by amplifiers 24 and 25 and supplied to a pulse detector 26 which may be an RF detector CD50 supplied by Texscan. This detector filters out the RF oscillations in the code pulses to present well formed pulses at its output. The output from detector 26 is supplied to a pulse decoder 22 which decodes the output supplied by the surface acoustic wave device. The pulse logic decoder 22 is supplied with a power supply 27 and is driven by a 10 MHz clock oscillator 28. The pulse logic decoder and the 10 MHz clock oscillator both are supplied by the voltage output from a regulator 29.

The output from the pulse logic decoder 22 can be supplied to an LED display 30, which receives power from a regulator 31, to display the code supplied by the surface acoustic wave device. Additionally or alternatively, the output from the pulse logic decoder 22 may be supplied to a comparator 32 which compares the code supplied by the surface acoustic wave device to a code supplied by a store 33. If there is a match between the code supplied by the store 33 and the code supplied by the pulse logic decoder 22, a door 34, for example, may be unlocked or opened to permit entry into the protected area. The code stored in store 33 may be, for example, a single code common to all those who are permitted access to the protected area or may be a store of a plurality of codes each of which is personally assigned to a respective person who is allowed access to the protected area. In this latter situation, a printer, computer, or other type of apparatus may monitor the entrance and exit of each specific person allowed access to the protected area including times, days, months, etc. The comparator itself may be simply a digital computer of which there are numerous examples in the art.

Figure 6:
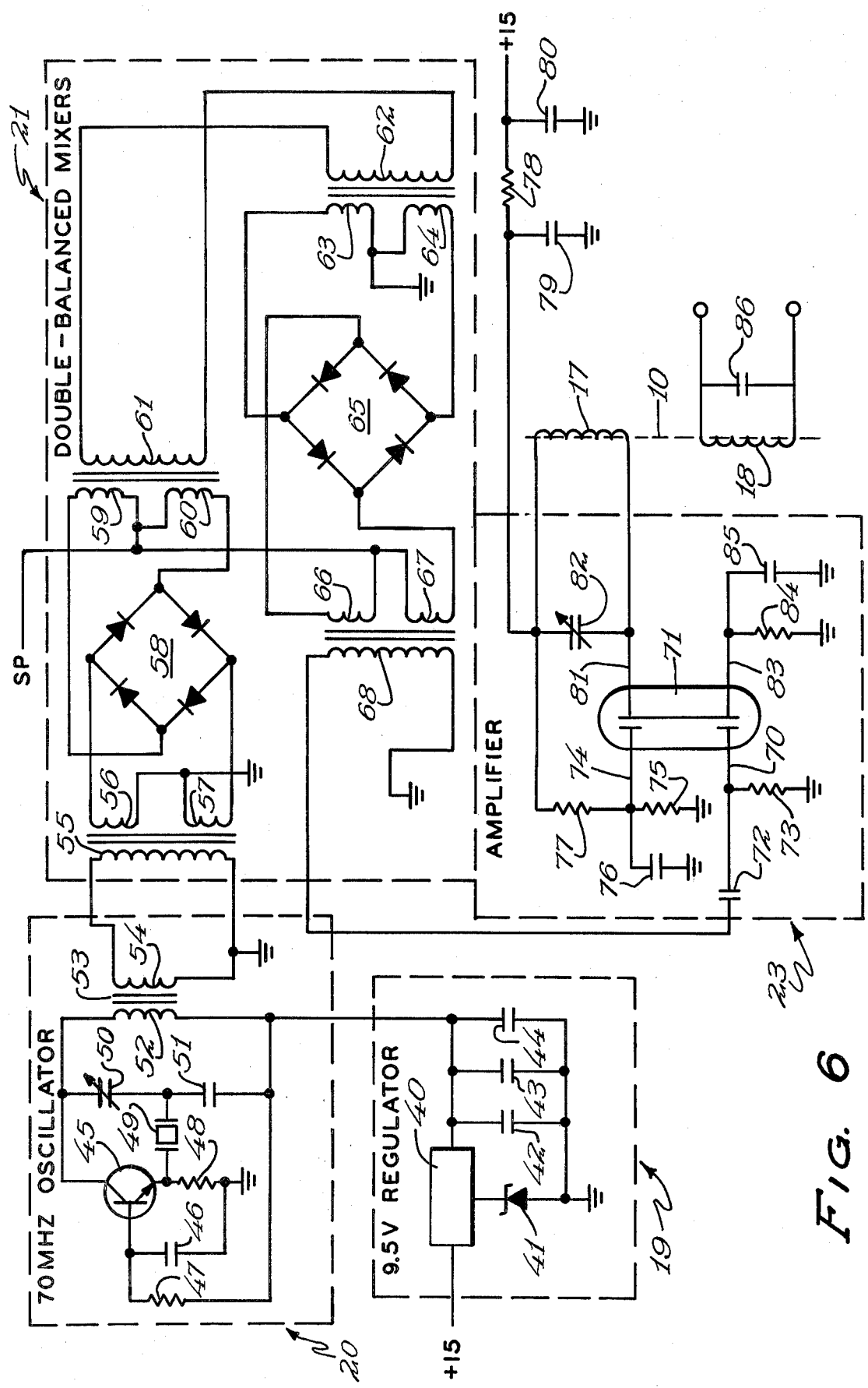
FIGS. 6–10 show the details of the boxes of FIG. 4.

FIG. 6 shows the regulator 19, oscillator 20, mixers 21 and amplifier 23 in more detail. Regulator 19 comprises a regulator 40, such as the Motorola MC 7805 regulator, connected to a positive voltage source and to a zener diode and then to ground. The zener is selected so that the regulator supplies the desired output voltage. The output from regulator 40 is also connected to three capacitors 42, 43 and 44 connected in parallel between the regulator 40 and ground. These capacitors then supply a regulated voltage to the oscillator 20.

Oscillator 20 comprises transistor 45 having a base connected to ground through capacitor 46 and connected to the output of regulator 19 through resistor 47. The emitter of transistor 45 is connected to ground through resistor 48 and is connected to one side of crystal 49 the other side of which is connected to the common junction of variable capacitor 50 and capacitor 51. The collector of transistor 45 is connected to the other side of capacitor 50 and regulator 19 is connected to the other side of capacitor 51. Connected across capacitors 50 and 51 is the primary 52 of transformer 53, the secondary 54 of which is connected to primary winding 55 of the double-balanced mixers circuit 21. One side of both windings 54 and 55 are grounded.

Primary winding 55 has secondary 56 and secondary 57, the common junction of which is grounded and the opposite ends of which are connected to opposite nodes of full wave rectifier 58. The output nodes of rectifier 58 are connected to opposite ends of windings 59 and 60 the common junction of which is connected to line SP which is supplied from the pulse logic decoder 22.

At this point, the 70 MHz signal is supplied to the double-balanced mixers 21 in which it is modulated by the pulses from pulse logic decoder 22. The modulated signal is supplied then to winding 61 which is directly connected to winding 62 for supplying the signal to secondary winding 63 and secondary winding 64 which have their common junction connected to ground and their opposite ends connected to opposite nodes of full wave rectifier 65 the other nodes of which are connected to opposite ends of windings 66 and 67 which have their common junction connected to the line SP and which supply the modulated signal to winding 68 for supply to amplifier 23.

The modulated signal is coupled to the first gate 70 of a double gated FET 71 through capacitor 72. The junction of capacitor 72 and gate 70 is connected to ground through resistor 73. The second gate 74 of the double-gated FET 71 is connected to ground through the parallel combination of resistor 75 and capacitor 76. The common junction of this parallel combination and the second gate 74 is connected through resistor 77 to a positive voltage supply through resistor 78. The junction of resistor 77 and resistor 78 is connected to ground through capacitor 79 and the junction of the resistor 78 and the positive supply is connected to ground through capacitor 80. The junction of resistors 77 and 78 is connected to electrode 81 of FET 71 through a variable capacitor 82. The electrode 83 is connected to ground through the parallel combination of resistor 84 and capacitor 85. Thus, the output from the amplifier 23 is taken from the electrode 81 and supplied to the transmitting antenna 17, connected across capacitor 82, for transmission to the surface acoustic wave device 10. The antenna 18, across which is connected capacitor 86, receives the coded signal for supply to its output terminals.

Figure 7:
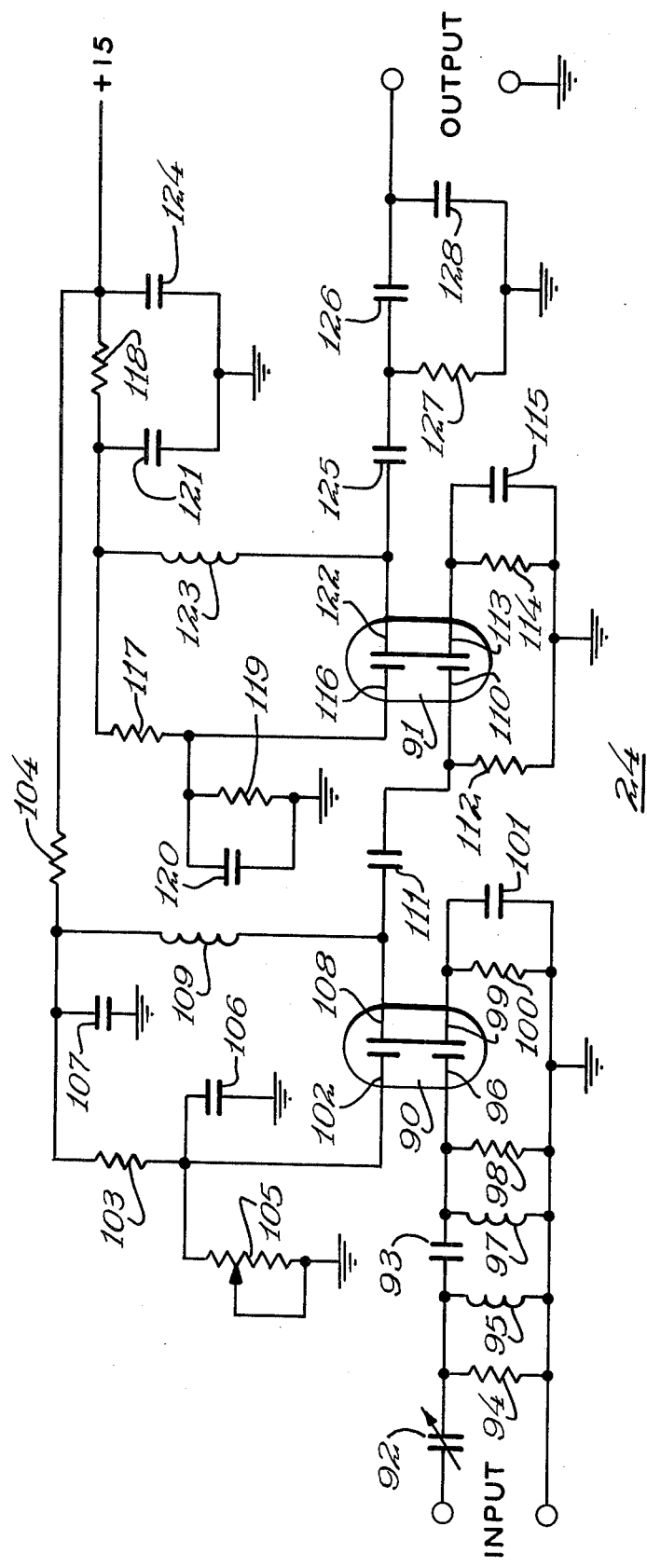

The output from antenna 18 is supplied to the input of amplifier 24 which is shown in more detail in FIG. 7. Amplifier 24 is a two-stage amplifier having two double gate FETs 90 and 91. The input signal is connected through a variable capacitor 92 to capacitor 93. Connected between the junction of capacitors 92 and 93 and ground is the parallel combination of resistor 94 and inductor 95. Capacitor 93 is connected to the first gate 96 of amplifier 90 and the junction of capacitor 93 and gate 96 is connected by a parallel combination of inductor 97 and resistor 98 to ground. Electrode 99 of amplifier 90 is connected to ground through the parallel combination of resistor 100 and capacitor 101. The second gate 102 of amplifier 90 is connected to series resistors 103 and 104 to the positive source and the junction of gate 102 and resistor 103 is connected to ground through the parallel combination of potentiometer 105 and capacitor 106. The junction of resistors 103 and 104 is connected to ground through capacitor 107 and is also connected to electrode 108 of amplifier 90 through winding 109.

Electrode 108 is connected to the first gate 110 of amplifier 91 by capacitor 111. The junction of capacitor 111 and gate 110 is connected to ground through resistor 112 and electrode 113 of amplifier 91 is connected to ground through the parallel combination of resistor 114 and capacitor 115. The second gate 116 of amplifier 91 is connected to the positive source through series resistors 117 and 118. The junction of gate 116 and resistor 117 is connected to ground through the parallel combination of resistor 119 and capacitor 120. The junction of resistors 117 and 118 is connected to ground through capacitor 121 and is also connected to the second electrode 122 through winding 123. The junction of resistor 118 and the positive source is connected to ground through capacitor 124. Electrode 122 is coupled to the output terminals through series capacitors 125 and 126. The junction of capacitors 125 and 126 is connected to ground through resistor 127 and the junction of the capacitor 126 and the output electrodes is connected to ground through capacitor 128.

The output terminals of the amplifier shown in FIG. 7 are connected to the input terminals of the amplifier 25 which is similar to the amplifier 24 shown in FIG. 7 and has, therefore, not been specifically duplicated.

Figure 8:
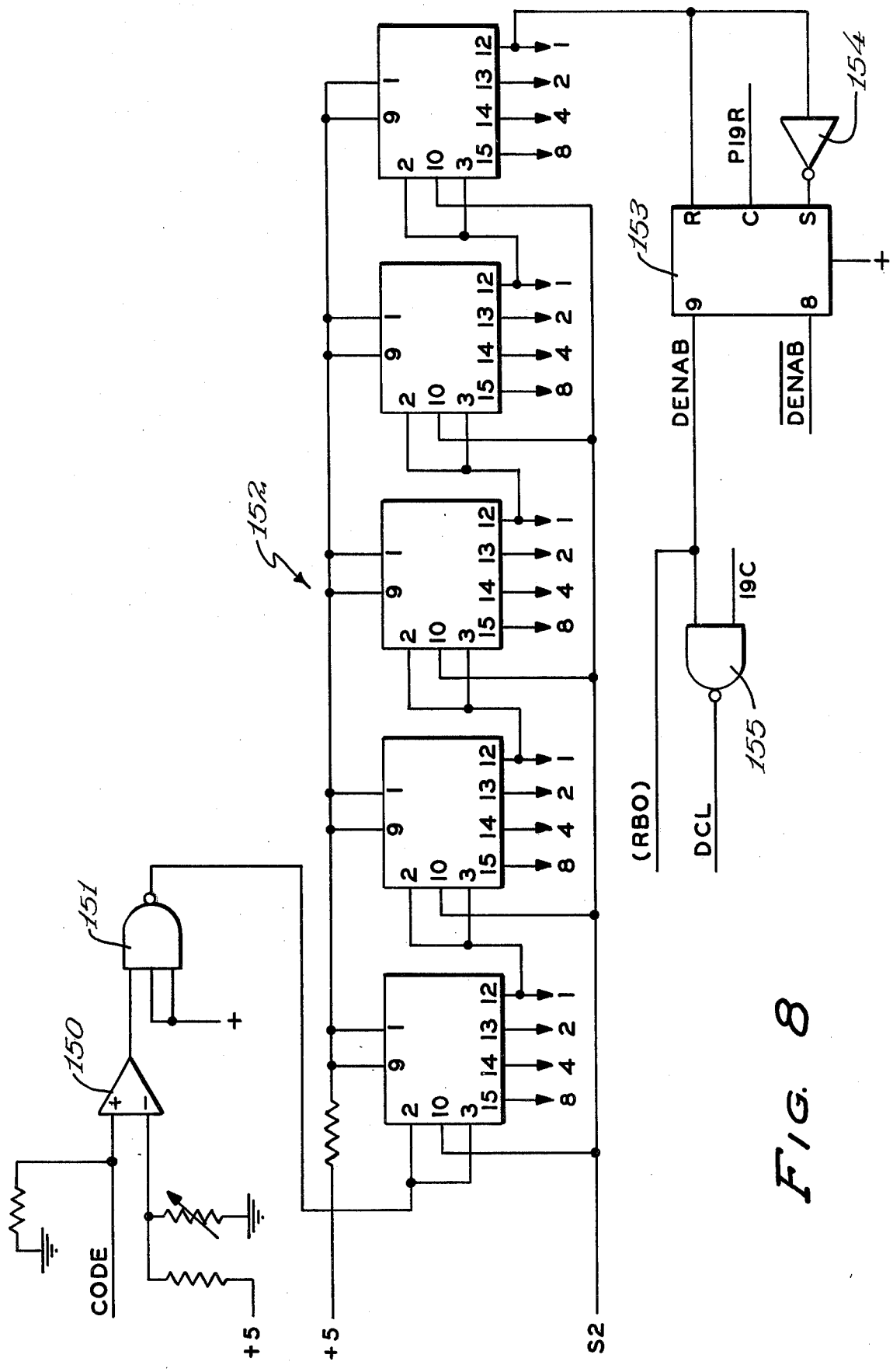

The output terminals of the amplifier 25 are connected to the input of the pulse detector previously mentioned which then supplies the amplified pulse code to the pulse logic decoder 22. The pulse logic decoder is shown in FIGS. 8, 9 and 10.

The code from the pulse detector is supplied to the positive terminal of an amplifier 150, the output of which is supplied to one input of a NAND gate 151 the other input terminals of which are tied to a positive source to form a logical "1." The output from the NAND gate 151 is connected to a shift register 152 comprised of, for example, five 9300 shift registers. Each shift register has four outputs for a total of twenty to match the twenty taps on the surface acoustic wave device. The code supplied by NAND gate 151 is shifted through the shift register 152 by clock line S2. The last output from the shift register 152 is supplied directly to the R terminal of R-S flip-flop 153 and is also supplied through an inverter 154 to the S terminal. The R-S flip-flop 153 provides the DENAB output and the RBO output and the DCL output from NAND gate 155 as shown. All of the outputs of the shift register shown in FIG. 8 are connected to the LED display for displaying the particular code which is stored in the shift register 152.

Figure 9:
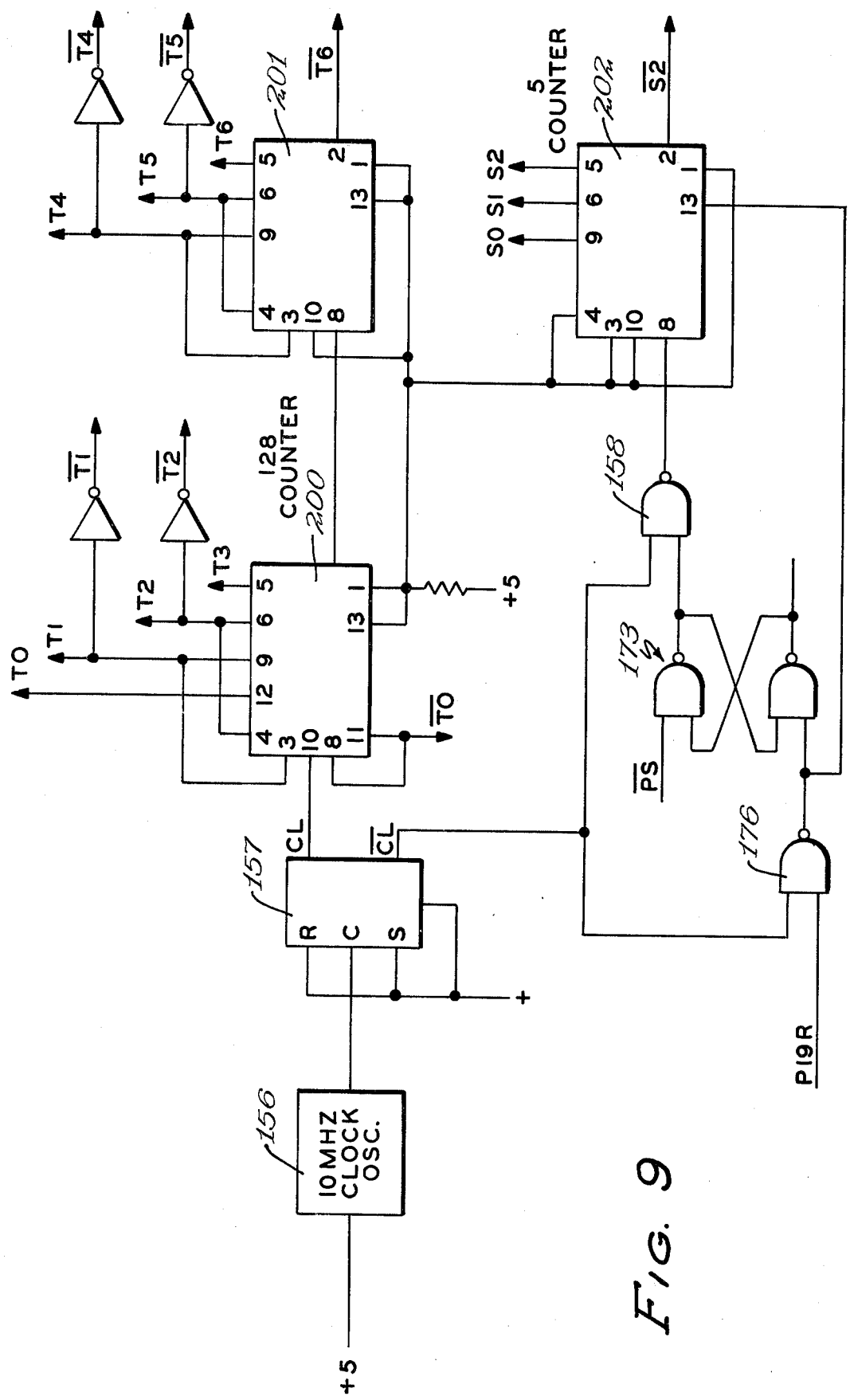

The clocking signal for the clock line S2 is generated by the clock shown in FIG. 9. The oscillator 156 is supplied with a positive voltage source and provides a 10 MHz signal, for example, to the clock terminal of R-S flip-flop 157 the R and S terminals of which are connected to a positive voltage source. This flip-flop devides the output from the oscillator in half to produce a 5 MHz signal. The CL output from R-S flip-flop 157 drives 128 counter 200-201 for providing the indicated outputs. The $\overline{CL}$ output from R-S flip-flop 157 is supplied through NAND gate 158 to supply 5 counter 202. The output S2 of 5 counter 202 is the signal which drives the clock line S2 of FIG. 8. These pulses occur once every microsecond and the output from 128 counter 200-201 is used to supply the SP pulse to the mixers for modulating the 70 MHz carrier signal.

Figure 10:
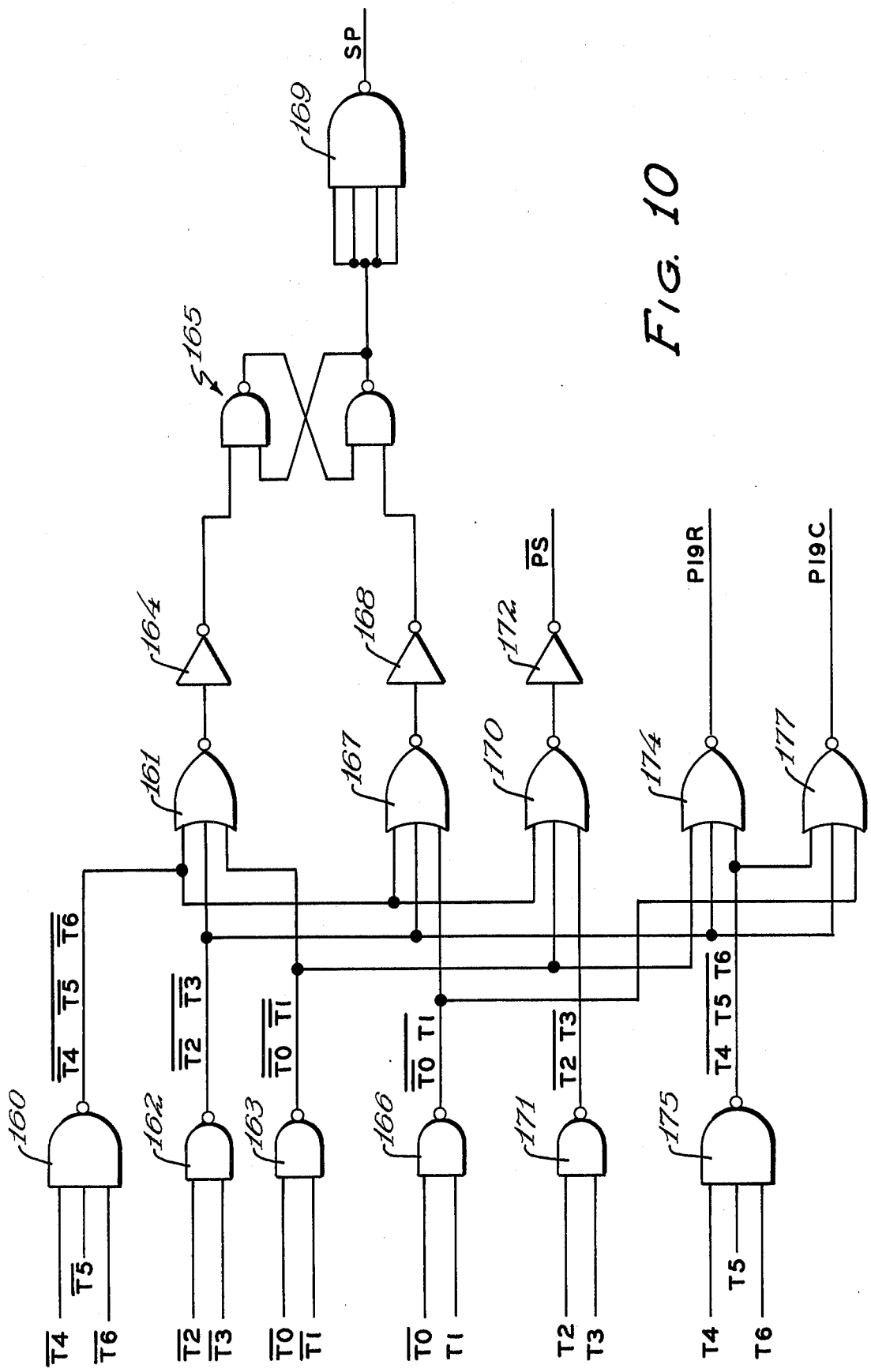

The outputs from the 128 counter are supplied to the inputs of FIG. 10 in the manner shown. These signals are combined to form the SP pulse which occurs each 25.6 microsecond. Specifically, terminal $\overline{T4}$, $\overline{T5}$ and $\overline{T6}$ from the 128 counter of FIG. 9 are supplied to the inputs of NAND gate 160 the output of which provides one input to NOR gate 161. Terminals $\overline{T2}$ and $\overline{T3}$ provide inputs to NAND gate 162 the output of which is connected to another input of NOR gate 161. Terminals $\overline{T0}$ and $\overline{T1}$ provide inputs to NAND gate 163 the output of which forms the last input to the NOR gate 161. The output from NOR gate 161 is connected through inverter 164 to one input of latch 165. Terminals T1 and $\overline{T0}$ provide inputs to NAND gate 166 the output of which is connected to one input of NOR gate 167. The output from NAND gate 162 provides another input to NOR gate 167 and the output from NAND gate 160 provides the last input to NOR gate 167. The output from NOR gate 167 is connected through inverter 168 to provide the other input to the NAND gate latch 165. The output from latch 165 is connected to all inputs of NAND gate 169 the output of which provides the SP signal.

Additionally, NOR gate 170 has an input from the output of NAND gate of 160, another input from the output of NAND gate 163 and a third input from the output of NAND gate 171 which receives input from the T2 and T3 terminals. The output of NOR gate 170 is supplied through inverter 172 to provide the PS output which is supplied to NAND gate latch 173 of FIG. 9.

Furthermore, NOR gate 174 has a first input from NAND gate 163, a second input from NAND gate 162 and a third input from NAND gate 175 which receives inputs from the T4, T5 and T6 terminals. The output from NOR gate 174 forms the P19R output which is connected to the input of NAND gate 176 in FIG. 9, the other input of which is connected to the $\overline{CL}$ output from flip-flop 157. The output of NAND gate 176 forms the second input of NAND gate latch 173 and also supplies the 5 counter. The output from latch 173 supplies the other input to NAND gate 158 for controlling the 5 counter. Additionally, the P19R output drives the clock terminal of R-S flip-flop 153 of FIG. 8.

Finally, NOR gate 177 receives a first input from NAND gate 175, a second input from NAND gate 162 and a third input from NAND gate 166 to provide the P19C output which forms the other input to the NAND gate 155 of FIG. 8.

Figure 11:
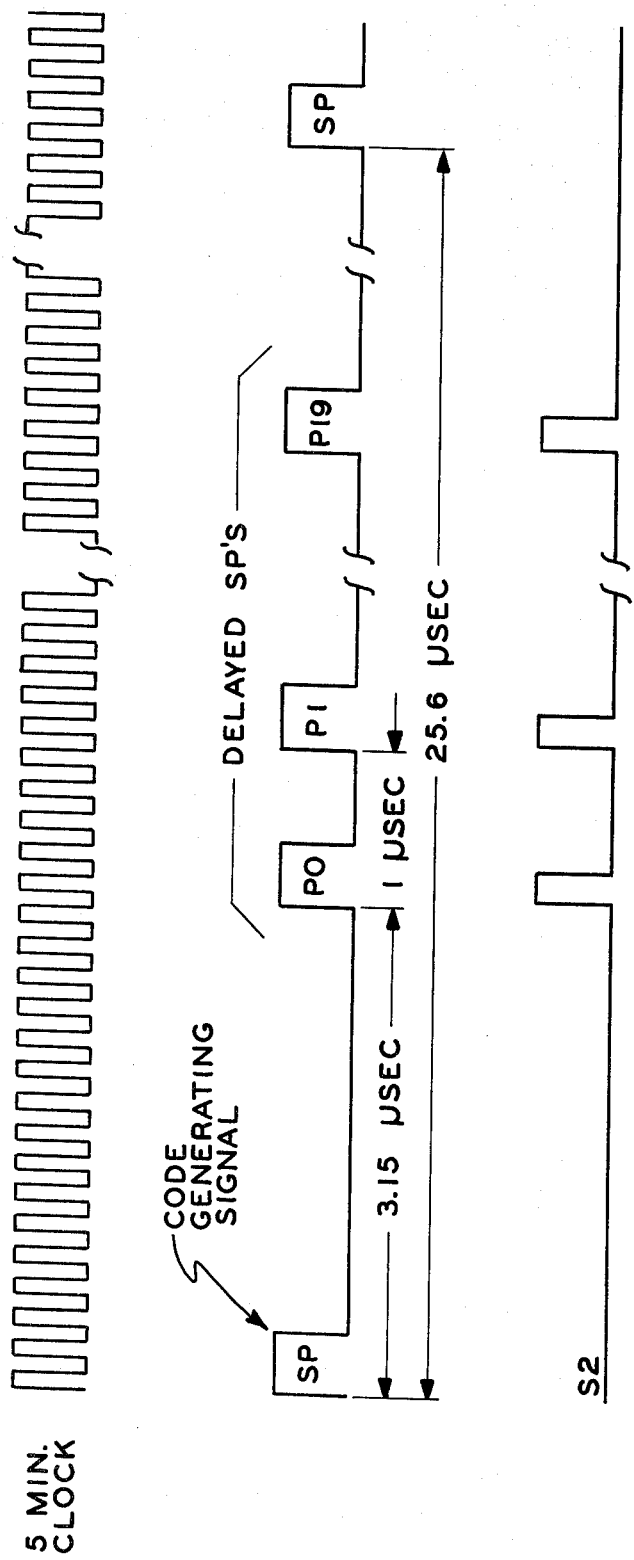
FIG. 11 shows the timing charts for the system according to the invention.

FIG. 11 shows the timing chart for the signals produced by the logic decoder 22. Specifically, the timing chart of FIG. 11 shows that the SP pulse is produced once every 25.6 microseconds followed by the output pulses from the surface acoustic wave device PO-P19 which will occur once every microsecond. These output pulses are shifted into the shift register 152 by the S2 pulses which likewise occur once every microsecond.

Once the pulse code is provided at the output of the shift register, they can be displayed by the LED display 30 shown in FIG. 4 or they can be compared to a code stored in store 33 for controlling a door or other opening 34 to permit access to a protected area.

The devices 200, 201 and 202 shown in FIG. 9 may be devices 9305 manufactured by any number of semiconductor manufacturers.

The embodiments of the invention in which an exclusive property or right is claimed are defined as follows:

1. An access control system, for permitting access to a protected area, utilizing a coded surface acoustic wave device, said system comprising:
   supply means for transmitting energy;
   surface acoustic wave means having energy receiving means for receiving said energy, first transducer means connected to said energy receiving means for converting said energy into surface acoustic waves, second transducer means for converting said surface acoustic waves into a coded signal, and code transmitting means connected to said second transducer means for transmitting said coded signal;
   receiver means for providing an output dependent upon said coded signal; and,
   output means connected to said receiver means for receiving said output to permit access to said protected area in response to a predetermined coded signal.

2. The system of claim 1 wherein said supply means includes a first antenna, said receiver means includes a second antenna, said energy receiving means includes a third antenna, and said code transmitting means includes a fourth antenna.

3. The system of claim 2 wherein said third and fourth antennas are so disposed that, when access to the protected area is to be gained, said third and fourth antennas are in substantially close proximity to said first and second antennas respectively.

4. The system of claim 3 wherein said surface acoustic wave means is contained within a first tube.

5. The system of claim 4 wherein said first and second antennas are disposed around a second tube having a greater diameter than said first tube for receiving internally said first tube.

6. The system of claim 5 wherein said output means comprises comparator means connected to said receiver means for comparing said coded signal to a predetermined code and adapted to permit access to said protected area if said coded signal matches said predetermined code.

7. The system of claim 1 wherein said output means comprises comparator means connected to said receiver means for comparing said coded signal to said predetermined code and adapted to permit access to said protected area if said coded signal matches the predetermined code.

8. The system of claim 7 wherein said supply means includes a first antenna, said receiver means includes a second antenna, said energy receiving means includes a third antenna, and said code transmitting means includes a fourth antenna.

9. The system of claim 8 wherein said third and fourth antennas are so disposed that, when access to the protected area is to be gained, said third and fourth antennas are in substantially close proximity to said first and second antennas respectively.

10. A reading system for reading a coded surface acoustic wave device comprising:
first and second antennas;
supply means connected to said first antenna for transmitting energy;
surface acoustic wave means having a third antenna for receiving said energy, first transducer means connected to said third antenna for converting said energy into surface acoustic waves, second transducer means for converting said surface acoustic waves into a coded signal, and a fourth antenna connected to said second transducer means for transmitting said coded signal, said third and fourth antennas being disposed so that, when said surface acoustic wave means is to be read, said third and fourth antennas are in substantially close proximity to said first and second antennas respectively;
receiver means connected to said second antenna for providing an output dependent upon said coded signal; and,
output means connected to receive said output.

11. The system of claim 10 wherein said output means comprises means for receiving said output to permit access to a protected area in response to a predetermined coded signal.

12. The system of claim 11 wherein said surface acoustic waves means is contained within a first tube.

13. The system of claim 12 wherein said first and second antennas are disposed around a second tube having a greater diameter than said first tube for receiving internally said first tube.

14. The system of claim 13 wherein said output means comprises comparator means connected to said receiver means for comparing said coded signal to a predetermined code and adapted to permit access to said protected area when said coded signal matches said predetermined code.

15. The system of claim 10 wherein said surface acoustic wave means is contained within a first tube.

16. The system of claim 15 wherein said first and second antennas are disposed around a second tube having a greater diameter than said first tube for receiving internally said first tube.

17. The system of claim 16 wherein said output means comprises comparator means connected to said receiver means for comparing said coded signal to a predetermined code.

* * * * *